United States Patent [19]
Toft

[11] Patent Number: 5,337,700
[45] Date of Patent: Aug. 16, 1994

[54] FOLDABLE, DISPOSABLE KITTY LITTER CONTAINER

[76] Inventor: Bobbie L. Toft, 23 Wilwall St., Ft. Waltonbeach, Fla. 32547

[21] Appl. No.: 154,082

[22] Filed: Nov. 18, 1993

[51] Int. Cl.$^5$ .............................................. A01K 67/00
[52] U.S. Cl. ...................... 119/168; 119/165; 229/122; 229/117.02; 30/161
[58] Field of Search ............ 119/168, 165, 15; 229/117.02, 101, 112, 113, 122; D30/112, 161

[56] References Cited

U.S. PATENT DOCUMENTS

| | | | |
|---|---|---|---|
| 3,793,989 | 2/1974 | Clark | 119/165 |
| 4,884,527 | 12/1989 | Skirvin | 119/165 |
| 4,919,078 | 4/1990 | Morrison | 119/165 |
| 4,986,217 | 1/1991 | Robinson et al. | 119/168 |
| 5,014,649 | 5/1991 | Jaft | 119/168 |
| 5,129,364 | 7/1992 | Pirkle | 119/168 |
| 5,178,100 | 1/1993 | Monk | 119/168 |

Primary Examiner—John G. Weiss

[57] ABSTRACT

A foldable, disposable, kitty liter container having an outside enclosure, a bottom disposable litter tray and a roof top. The outside enclosure fitting snugly over the bottom litter tray, and the bottom litter tray being disposable after several uses. The outside enclosure being made of a water resistant, and odor absorbing material, is re-useable for several bottom litter trays. The enclosure has four indentations, one in each of the four top corners. These indentations are pushed inward to form a support for the separate roof top pieces of the container. Also, four pointed corner structures, at the top of the enclosure provide scratching, and playing objects for the cat. The bottom litter tray contains a unique system of tabs, slots, and creases to fold and lock the tray in a folded position. The tabs are pre-formed, and the slots are pre-cut into the material. The tabs are used to be inserted into the slots to lock the bottom tray in the folded position.

1 Claim, 3 Drawing Sheets

FOLDABLE, DISPOSABLE KITTY LITTER CONTAINER

BACKGROUND OF INVENTION

This invention relates to an apparatus and method of providing a disposable kitty litter container, encased in a very attractive, and useful enclosure.

These containers are well known in the pet industry, and there are a multitude of problems associated with their use. One problem with the open type containers is the action of the pet, as they use the litter. The cat always covers the excrement each time they use the container, and this action of the cat spreads the litter out of the container area, with unsightly, results. Also, after the cat uses the kitty litter, though the cat covers the excrement, an odor remains after several uses of the litter tray.

In many cases, the cat refuses to use the litter container, due to its not being designed correctly, and, the cat may feel threatened during the use of the litter container. During this exercise, cats are very cognizant of their precarious position, and want to feel safe and secure.

It has been customary to provide litter containers that try to eliminate the spillage of the litter, after and during use. Skirvin, in U.S. Pat. No. 4,884,527, teaches an enclosed litter container, also disposable, which has an entrance, but, does not have windows, or other openings to provide sufficient light for the cat to feel safe, and not trapped in a dark space, with no openings for escape. The inventor has found through experimentation, that large window openings in the litter container provide light, and emergency exit from the interior, and are more conducive to the cats use.

Also, several approaches have provided in the prior arts for easy disposing of the containers, once they have been used several times. Morrison, in U.S. Pat. No. 4,919,078 teaches a multiple system of disposable litter bags. As each bag is opened, and used several times, it is discarded, and another bag is opened for use by the cat. The problem with this system is that after several uses, an odor is present in the remaining bags, even though they are not opened, and this odor permeates the room until the litter bags must be discarded, even though they have not been used.

Also, due to the size of the litter containers, it has been taught in the prior arts to provide a container that folds to a very small area, for marketing, and home storage purposes. Such an art is disclosed by Taft, in U.S. Pat. No. 5,014,649, wherein a foldable container, having a house like design is taught. The problem with this design is that there are no windows in the container, which gives the cat a trapped feeling during the exercise. Also, this art requires that the entire container be disposed of after several uses.

SUMMARY OF THE INVENTION

Accordingly, it is an object of this invention to provide a disposable kitty litter container, which has a separate bottom litter tray, and only this bottom portion need be disposed of after several uses. The outer, surrounding enclosure, being odor proofed, and water resistant, can be reused for several bottom portions before being disposed of. Another object of this invention is to provide a kitty litter container that has a main opening, with the addition of window type openings, of sufficient size, giving the cat the feeling of security and privacy and thus promoting continual use of the container especially for young kittens in the training stage.

Another object of this invention is to provide a kitty litter container that has a two piece roof, and is strong enough to support the cat while playing. The roof also has several pointed protrusions for the cat to scratch their backs, and play with.

Still another object of this invention is to provide a kitty litter container, which can be folded almost flat, for easy storage, and packaged to fill only a small shelf area, This provides a more marketable, and easily handled container.

In carrying out this invention in the illustrative embodiment thereof, a kitty litter container, having four distinct, and separate parts is provided. A foldable outside enclosure, a separate foldable bottom container, and two separate roof portions.

The outside enclosure is unfolded, and has four small indented roof supports, one such support located in each of the top corners of the outside enclosure. These roof supports are pre-cut in the top corners of the enclosure, and can be indented inwardly, to form four supports for the two roof top pieces to be held. The two roof top pieces lie flat on top of one another to provide sufficient support for the weight of the cat, while playing on the roof top of the enclosure. The two roof top pieces of material also provide structural support to rigidify the enclosure while unfolded.

Now, the bottom kitty litter container is folded using the pre-creased sides, the pre-creased ends, and four pre-cut slots to firmly hold and lock the bottom container in a folded position. This bottom container also provides structural support to rigidify the bottom section of the enclosure in the unfolded position. In the unfolded position, the outside enclosure fitting snugly over the sides of the bottom container, thereby preventing the kitty litter from being dispursed outside the container during covering of the excrement. In addition, the outside enclosure, the bottom container, and the roof top pieces are moisture and odor proofed. The outside enclosure has a main opening for the cat to enter, and several large window openings, to provide sufficient light, and to provide an escape route for the cat, giving the cat security and privacy during the exercise. The outside enclosure is now fitted over the bottom container, the bottom container is filled with kitty litter, and is ready for use by the cat. The outside enclosure can be used many times with a plurality of disposable bottom trays before being disposed of.

Conveniently, the user may unfold the outside enclosure, push the four indentations to the inward position, place the two top pieces in position as the roof of the enclosure, simply fold, and lock the bottom portion into a container, place sufficient kitty litter in the bottom container, fit the outside enclosure over the bottom container, and a very attractive, foldable, disposable kitty litter container is provided. When the bottom container has been used several times, it is discarded, and a new bottom container, provided in the packaging, is folded and inserted inside the outer enclosure. The outer enclosure being used for a multitude of times before being discarded.

BRIEF DESCRIPTION OF THE DRAWINGS

This invention, together with other objects, features, aspects and advantages thereof, will be more clearly understood from the following description, considered in conjunction with the accompanying drawings.

Three sheets of drawings are furnished, sheet one contains FIG. 1, and FIG. 2, and sheet 2 contains FIG. 3, and FIG. 4, and sheet 3 contains FIG. 5, and FIG. 6.

DESCRIPTION OF THE PREFERRED EMBODIMENTS

Figure 1:
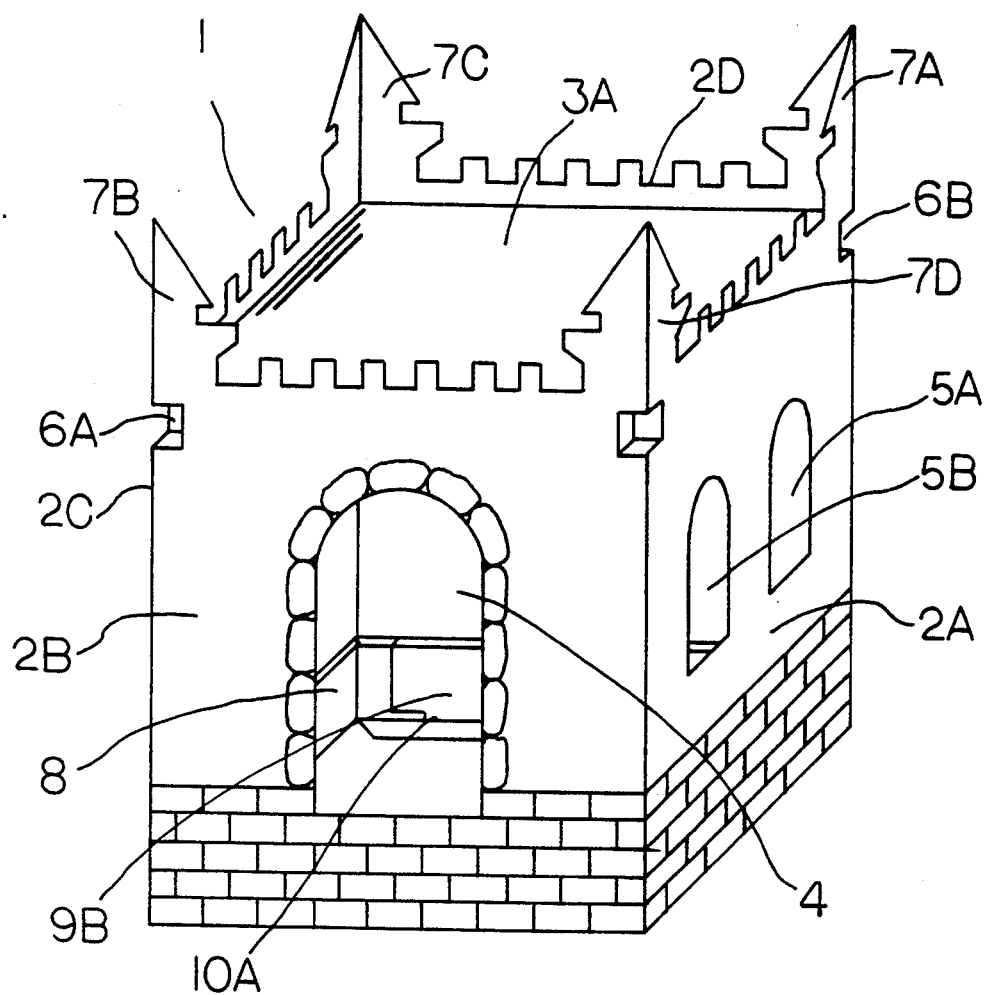
FIG. 1 is an isometric view of the invention, showing the front entrance, two of four side windows, the roof top, three of four indented supports, and also the four top pointed corner structures.

Referring now to FIG. 1, a Foldable, Disposable, Kitty Litter Container, referred to generally by the reference numeral 1, is made of a water resistant, light weight material, conducive to folding, having a side 2a, a front side 2b, a side 2c opposite side 2a, a rear side 2d opposite side 2b, and as seen in FIG. 1, side 2a having windows 5a, and 5b, (side 2b has window openings, not shown), and front side 2b having a larger front opening 4, for purposes of allowing the pet to enter. Container 1 has an open top, and an open bottom, and can be considered as an enclosure.

Figure 4:
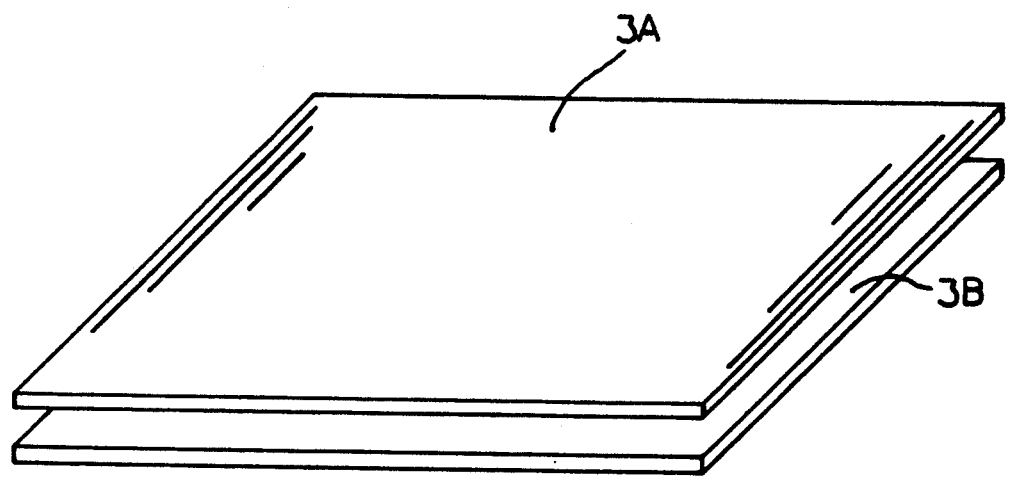
FIG. 4 is an isometric view of the two roof top pieces, used to stabilize the outside enclosure, and, to provide a solid top for the weight of the pets to use during play and rest.

Now, container 1 has four pre-cut indentations 6a, 6b, 6c, and 6d, formed into the four upper corners of container 1, (pre-cut indentation 6d not shown in figure one) and when these indentations, 6a-6d, are pushed inward, into the inside area of container 1, they form a rest, or support, for roof top section 3a. The roof top section 3a in turn, forms strengthening members for container 1 to be substantially rectangular in the unfolded position. Container 1 also has four upward extending, pointed corners, 7a-7d, for purposes of pet playing or scratching. Also, as can better be seen in FIG. 4, an additional roof top strengthener 3b is laid under roof top 3a, to better strengthen and rigidify the enclosure 1. Also roof tops 3a and 3b provide ample support for the weight of the pets to perch on top of the enclosure 1.

Figure 2:
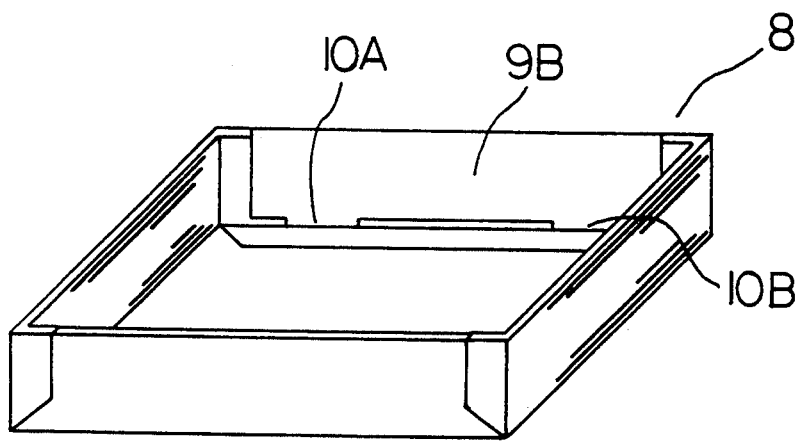
FIG. 2 is an isometric view of the disposable bottom litter tray in a folded position.
Figure 5:
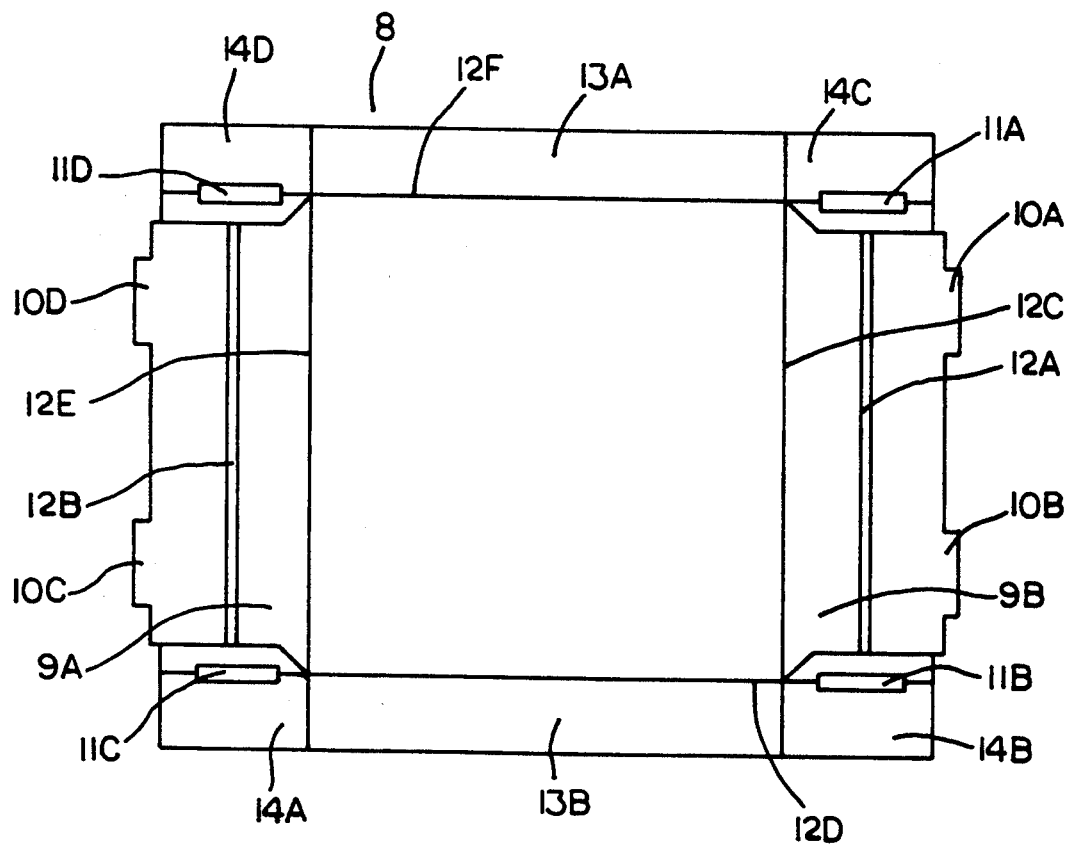
FIG. 5 is an overhead view of the bottom litter tray in an unfolded position, showing the folding creases, the four locking slots, and the locking tabs.

Referring again to FIG. 1, and looking through front opening 4, we see bottom litter tray 8, made from water resistant, odor absorbing, easily folded material, and, being of a foldable nature, having overlapping end pieces 9a, and 9b, and locking flaps 10a, 10b, 10c, and 10d, more easily seen in FIG. 5. Still referring to FIG. 1, we see the bottom tray 8, and locking tabs 10a in place, and bottom tray 8 having been inserted inside the bottom of container 1. Progressing now to FIG. 2, we see bottom tray 8 in a useable, folded position, using flap 9b, and locking tabs 10a and 10b. Further progressing to FIG. 5, we see the complete, flat, unfolded bottom tray 8. Bottom tray 8 has creases 12a-12f pre-formed into its top surface, and also tray 8 has four locking slots 11a-11d completely cut through the surface of bottom tray 8. Still referring to FIG. 5, we see two side flaps 13a, and 13b, and these two side flaps having four creased corner sections 14a, 14b, 14c, 14d.

Figure 6:
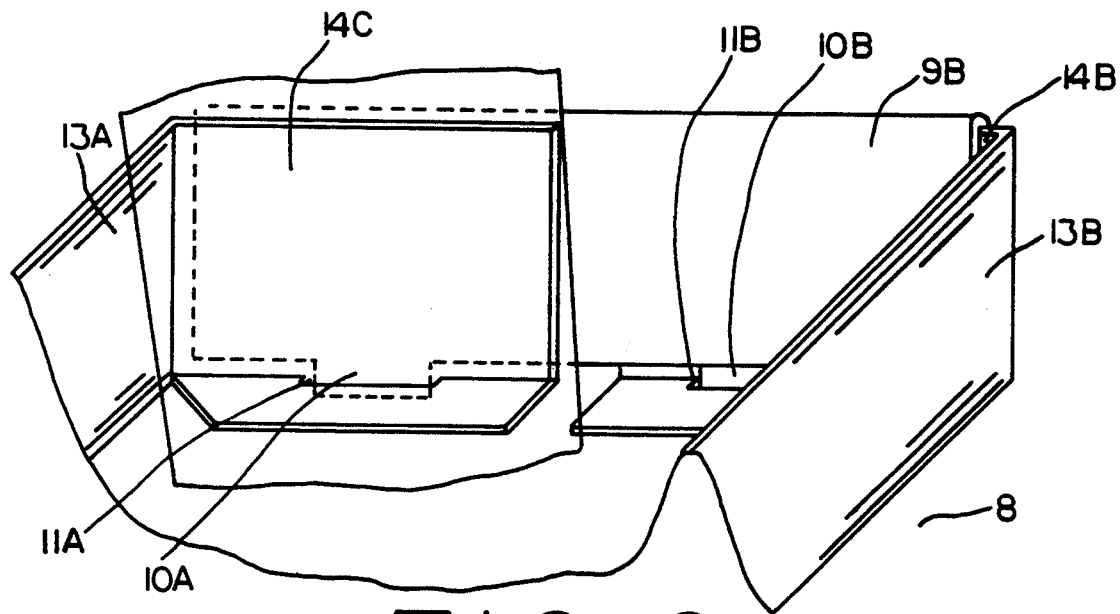
FIG. 6 is an isometric cut-away view of the bottom litter tray, showing the method of locking the litter tray in a folded position.

Returning to FIG. 6, we see side flaps 13a and 13b folded in an upright position, and corner sections 14b and 14c folded, and inserted into the opening produced when end flap 9b is folded up, and over corners 14b and 14c, using crease 12a, and 12c. Corners 14b and 14c, and end flap 9b, are locked into place when locking tabs 10a and 10b are inserted into locking slots 11a and 11b. Folding of bottom tray 8 is facilitated by creases 12a-12f.

Figure 3:
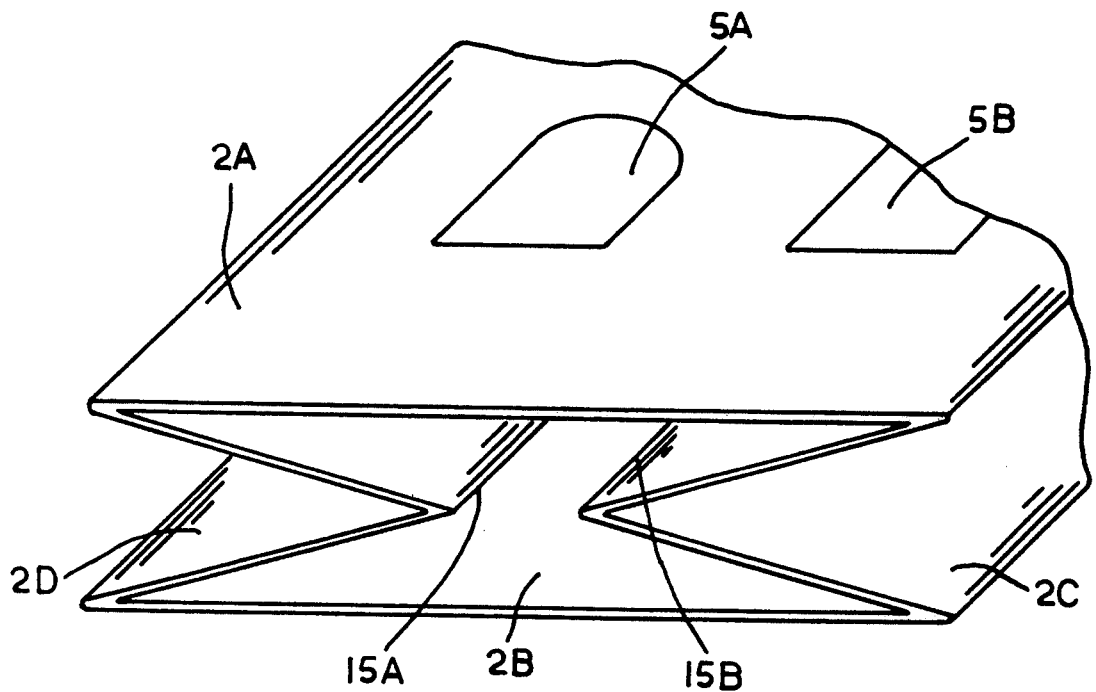
FIG. 3 is an isometric view of the outside enclosure in a semi-folded position, showing the use of the creases to fold, and unfold the enclosure.

Referring now to FIG. 3, we see container 1 in a semi-folded position, using creases 15a, and 15b. Container 1 can be folded completely flat, for storage purposes, or completely unfolded as shown in FIG. 1.

Accordingly, a very unique, attractive, convenient method and apparatus are provided for a pet, especially a cat, to enter, and perform needed duties, plus, it provides for the cat to play on the top of the container, thereby getting familiar with the enclosure. Large side windows are provided for allowing the cat to feel secure inside the container, and to provide sufficient lighting, as well as emergency exit.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A foldable, disposable kitty litter container, comprising four distinct, and separate parts:

a semi permanent, foldable, substantially square outside enclosure, said enclosure, when unfolded, having a front section with entry means, a rear section, a right side section with window means, and a left side section with window means, an open top, and an open bottom, thereby creating said enclosure, said enclosure also having four corners, said enclosure having scratching posts located at the top of each said four corners, said enclosure having four indentations cut through its horizontal surface, but said indentations only creased through its vertical surface, one said indentation at each said corner, and said indentations being located a distance downward from said open top, said indentations being puffball inwardly, and foldable inwardly into said enclosure, and said indentations thereby forming a top support system at each said corner, a separate substantially square two piece top section, said two piece top section being two flat pieces of material, formed to fit snugly inside said open top of said enclosure, and said two piece top section being supported at each said corner by said pushed inwardly indentations, and, one said top piece being lain on top of the other said top piece, said two piece top sections adding strength, and stability to said enclosure, a foldable, and disposable bottom litter tray, said bottom litter tray being, substantially square when folded, said bottom litter tray being of an outside dimension to fit snugly into said open bottom of said enclosure, when said bottom litter tray being in the folded position, said bottom litter tray having folding means, and, locking means, said folding means being a unique pattern of pre-formed creases in said material, and at least four pre-cut slots in said material, said pre-formed creases thereby forming said bottom litter tray, when in the folded position, said locking means of said bottom tray being four unique pre-formed tabs, said pre-formed tabs being inserted into four said pre-cut slots, said tabs and said slots thereby locking said bottom litter tray in the folded position.

* * * * *